(12) United States Patent
Zhou (10) Patent No.: US 9,376,592 B2
(45) Date of Patent: Jun. 28, 2016

(54) ARTIFICIAL PARTICLE AND PREPARATION METHOD THEREOF

(71) Applicant: Shenzhen Green Oubiao Technology Co., Ltd., Shenzhen, Guangdong (CN)

(72) Inventor: Yueliu Zhou, Shenzhen (CN)

(73) Assignee: SHENZHEN GREEN OUBIAO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/337,393

(22) Filed: Jul. 22, 2014

(65) Prior Publication Data

US 2015/0184020 A1     Jul. 2, 2015

(30) Foreign Application Priority Data

Dec. 30, 2013   (CN) .......................... 2013 1 0750020

(51) Int. Cl.
| | |
|---|---|
| *C09D 183/04* | (2006.01) |
| *C09D 123/22* | (2006.01) |
| *C09D 109/02* | (2006.01) |
| *C09D 109/00* | (2006.01) |
| *C09D 123/14* | (2006.01) |
| *C09D 109/06* | (2006.01) |
| *C08K 9/08* | (2006.01) |

(52) U.S. Cl.
CPC ............. *C09D 183/04* (2013.01); *C08K 9/08* (2013.01); *C09D 109/00* (2013.01); *C09D 109/02* (2013.01); *C09D 109/06* (2013.01); *C09D 123/14* (2013.01); *C09D 123/22* (2013.01); *Y10T 428/2993* (2015.01); *Y10T 428/2995* (2015.01); *Y10T 428/2996* (2015.01); *Y10T 428/2998* (2015.01)

(58) Field of Classification Search
None
See application file for complete search history.

(56) References Cited

U.S. PATENT DOCUMENTS

| | | | |
|---|---|---|---|
| 6,716,527 B1 * | 4/2004 | Czmok | B01J 2/006 428/403 |
| 2002/0048676 A1 | 4/2002 | McDaniel et al. | |
| 2005/0215667 A1 * | 9/2005 | Shimaoka | C08F 265/04 523/201 |
| 2006/0078682 A1 * | 4/2006 | McDaniel | C09K 3/1436 427/372.2 |
| 2007/0202318 A1 * | 8/2007 | Smith | B01J 13/02 428/323 |
| 2009/0186221 A1 * | 7/2009 | Yatagai | C09J 7/0214 428/355 AC |

FOREIGN PATENT DOCUMENTS

CN            1492803 A        4/2004

* cited by examiner

*Primary Examiner* — Alexandre Ferre
(74) *Attorney, Agent, or Firm* — Coats & Bennett, P.L.L.C.

(57) ABSTRACT

An artificial particle includes a core and a coating layer wrapped on a surface of the core. The coating layer includes a continuously distributed rubber adhesive and a dispersant dispersed in the rubber adhesive. The rubber adhesive is at least one selected from the group consisting of uncross-linked rubber and semi-cross-linked silicone rubber. In addition, a method of preparing artificial particle thereof is provided.

17 Claims, 4 Drawing Sheets

ARTIFICIAL PARTICLE AND PREPARATION METHOD THEREOF

CROSS-REFERENCE TO RELATED APPLICATIONS

This application claims priority to Chinese Application No. 201310750020.6, titled "ARTIFICIAL PARTICLE AND PREPARATION METHOD THEREOF", filed on Dec. 30, 2013, which is hereby incorporated by reference in its entirety.

FIELD OF THE INVENTION

The present disclosure relates to artificial particles and preparation methods of artificial particles.

BACKGROUND OF THE INVENTION

Natural sand exhibits either plasticity or liquidity. For example, clay and plasticine can be shaped. They possess excellent plasticity but lack liquidity. Quicksand can flow but cannot be shaped. It possesses excellent liquidity but lacks plasticity. Although wet beach sand possesses plasticity and liquidity simultaneously, once the water is evaporated, it becomes dry and only has liquidity. It no longer possesses plasticity. Normally, natural sand does not possess plasticity and liquidity for a significant period of time.

SUMMARY OF THE INVENTION

According to this, it is necessary to provide an artificial particle and a preparation method thereof which has plasticity and liquidity for a long time.

An artificial particle includes a core and a coating layer. The coating layer includes a continuously distributed rubber adhesive and a dispersant dispersed in the rubber adhesive; the rubber adhesive is at least one selected from the group consisting of uncross-linked rubber and semi-cross-linked silicone rubber.

A method of preparing an artificial particle includes the steps of:

mixing a rubber adhesive and a dispersant to form a coating material, where the rubber adhesive is at least one selected from the group consisting of uncross-linked rubber and semi-cross-linked silicone rubber; and mixing the coating material and a core, forming a coating layer on a surface of the core, where the coating layer includes a continuously distributed rubber adhesive and a dispersant dispersed in the rubber adhesive;

A method of preparing an artificial particle includes the steps of:

mixing a rubber adhesive and a core, where the rubber adhesive is wrapped on a surface of the core, the rubber adhesive is at least one selected from the group consisting of uncross-linked rubber and semi-cross-linked silicone rubber; and mixing the core wrapped with the rubber adhesive and a dispersant, forming a coating layer on a surface of the core, the coating layer includes a continuously distributed rubber adhesive and a dispersant dispersed in the rubber adhesive.

The coating layer of the artificial particle is wrapped on the surface of the core. The coating layer includes a continuously distributed rubber adhesive and a dispersant dispersed in the rubber adhesive. The rubber adhesive is at least one selected from the group consisting of uncross-linked rubber and semi-cross-linked silicone rubber. The uncross-linked rubber and semi-cross-linked silicone rubber have plasticity and adhesion, thus the rubber adhesive can be well wrapped on the surface of the core, and a plurality of artificial particles can be shaped together. The distribution of the dispersant can reduce or partially destroy the adhesion of the rubber adhesive. The distribution of the dispersant allows that the artificial particle has plasticity and liquidity, simultaneously. Moreover, due to the stability, great oxidation resistance, and light resistance of the uncross-linked rubber and the semi-cross-linked silicone rubber, the rubber adhesive can form a stable system combined with the dispersant, the functions of the artificial particle can be maintained for at least nine months without any change. Accordingly, the artificial particle has plasticity and liquidity for a long time.

DETAILED DESCRIPTION OF THE EMBODIMENTS

A more particular description of the artificial particle and a method for preparing the artificial particle will be illustrated by reference to specific embodiments and drawings.

Figure 1:
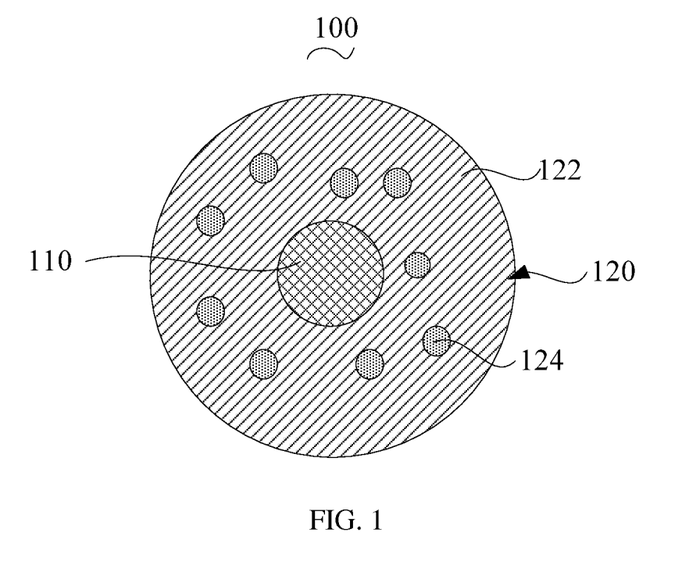
FIG. 1 is a schematic view of an artificial particle according to an embodiment.

Referring to FIG. 1, an embodiment of an artificial particle 100 includes a core 110 and a coating layer 120 wrapped on a surface of the core 110. The coating layer 120 includes a continuously distributed rubber adhesive 122 and a dispersant 124 dispersed in the rubber adhesive 122.

Preferably, a volume percentage of the core 100 in the artificial particle is in a range of 70% to 99%; a volume percentage of the rubber adhesive 122 in the artificial particle is in a range of 0.9% to 18%; a volume percentage of the dispersant 124 in the artificial particle is in a range of 0.1% to 12%.

More preferably, a volume percentage of the core 110 in the artificial particle is in a range of 85% to 97%; a volume percentage of the rubber adhesive 122 in the artificial particle is in a range of 2% to 9%; a volume percentage of the dispersant 124 in the artificial particle is in a range of 1% to 6%; the artificial particle 100 with that ratio has much more appropriate adhesion and dispersibility; thus having much better plasticity and liquidity. The artificial particle 100 with plasticity and liquidity means that: when a plurality of artificial particles 100 are pressed or squeezed, the artificial particles 100 can form a certain shape and can maintain the certain shape for some time, i.e. the artificial particles 100 have plasticity. When the shaped artificial particles 100 are placed for a period of time, or destroyed by slightly force, the artificial particles 100 will become loose, then the artificial particles 100 will flow, i.e. the artificial particles 100 have fluidity. The time of maintaining the certain shape for the artificial particles 100 can be adjusted according to the needs, the time can be adjusted in a range of from one second to one month.

The core 110 is selected from the group consisting of polyacrylonitrile plastic particle, ethylene-vinyl acetate copolymer particle, polystyrene particle, quartz sand, river sand, sea sand, silica sand, glass bead, glass sand, humus, wood flour, grass meal, straw, and starch.

When the quartz sand, river sand, sea sand, silica sand, glass bead, glass sand, humus, wood flour, grass meal, straw, or starch is used as the core 110, thus the artificial particle 100 can be applied to children's toy, playground and so on, which is valuable.

The rubber adhesive 122 is at least one selected from the group consisting of uncross-linked rubber and semi-cross-linked silicone rubber. The conventional rubber has to be vulcanized (i.e. cross-linked) to form an elastomer with high strength, certain shape and no plasticity. While both the uncross-linked rubber and semi-cross-linked silicone rubber have plasticity and adhesion, thus the uncross-linked rubber and semi-cross-linked silicone rubber can reliably be wrapped on the surface of the core 110, such that the artificial particle 100 has plasticity.

The uncross-linked rubber is the rubber having no polymeric reaction with the cross-linking agent. Preferably, the uncross-linked rubber is at least one selected from the group consisting of polyisoprene rubber, polybutadiene rubber, polyisobutylene rubber, butyl rubber, ethylene propylene rubber, silicone rubber, nitrile rubber (butadiene and acrylonitrile copolymer), and styrene-butadiene rubber (butadiene and styrene copolymer).

Preferably, the semi-cross-linked silicone rubber is a silicone rubber cross-linked with boron. The silicone rubber cross-linked with boron is obtained from a partially cross-linked (semi-cross-linked) reaction between the cross-linking agent and polydimethylsiloxane, where the cross-linking agent is boric acid or borate. The silicone rubber cross-linked with boron is semisolid, which has self-leveling, self-adhesive, plasticity, and softening.

The different uncross-linked rubbers have different tear strengths, the semi-cross-linked silicone rubber and the uncross-linked rubber have different tear strengths, thus when the different uncross-linked rubbers are mixed, or the semi-cross-linked silicone rubber and the uncross-linked rubber are mixed, the rubber adhesive 122 can have appropriate tear strength, furthermore, the artificial particle 100 has a certain adhesive strength to better implement the plasticity and fluidity.

Preferably, the rubber adhesive 122 is a mixture of polyisoprene rubber and nitrile rubber, a volume ratio of the polyisoprene rubber to the nitrile rubber is 1 to 4:6 to 9. The rubber adhesive 122 with different adhesion and stringiness can be obtained by mixing two uncross-linked rubbers according to different ratios. The rubber adhesive 122 is firmly wrapped on the surface of the core 110, and the dispersant 124 is firmly fixed inside of the rubber adhesive 122.

The dispersant 124 is dispersed in the rubber adhesive 122, which can reduce or partially change the adhesion of the rubber adhesive 122. The adhesion of the rubber adhesive 122 can be adjusted by the dispersant 122, thus the artificial particle 100 has fluidity. Moreover, the different tear strengths of the covering layer 120 can be obtained by adjusting the relationship between the rubber adhesive 122 and the dispersant 124, therefore meeting the plasticity and fluidity needs of the artificial particle 100.

The dispersant 124 is at least one selected from the group consisting of carbonate, silicate, vulcanized rubber powder, silica powder, glass microsphere, acrylonitrile polymer microcapsule expansion foam powder, fatty acid ester surfactant, alkyl benzene sulfonate emulsifier, paraffin oil, naphthenic oil, silicone oil, petroleum resin, terpene resin, magnesium oxide, aluminum oxide, and silicon oxide. The stability of those dispersant 124 is great, the dispersant 124 can form a stable system combined with the rubber adhesive 122; thus the functions of the artificial particle 100 can be maintained for a long period.

Preferably, the carbonate is calcium carbonate or magnesium carbonate. Preferably, the silicate is calcium silicate or magnesium silicate.

For example, pulvistalci can be added, where the magnesium silicate is the main component of the pulvistalci.

Preferably, the vulcanized rubber powder is vulcanized butylbenzene rubber powder or vulcanized nitrile butadiene rubber powder.

Preferably, the fatty acid ester surfactant is glycerol monooleate or sorbitan monostearate.

Preferably, the alkyl benzene sulfonate emulsifier is sodium linear-dodecylbenzene sulfonate or dodecyl benzene sulfonate triethyl hydrate amite.

Preferably, the dispersant 124 is a mixture of calcium carbonate and naphthenic oil, a volume ratio of the calcium carbonate to the naphthenic oil is 7:1.

Preferably, the dispersant 124 is a mixture of magnesium silicate and silicone oil, a volume ratio of the magnesium silicate to the silicone oil is 9:1.

Preferably, the dispersant 124 is a mixture of silicon oxide and sodium linear-dodecylbenzene sulfonate, a volume ratio of the silicon oxide to the sodium linear-dodecylbenzene sulfonate is 42:5.

By using those mixtures as the dispersant 124, the dispersant 124 is more easily dispersed in the rubber adhesive 122, and the dispersant 124 can form a more stable system combined with the rubber adhesive 122, thus the functions of the artificial particle 100 can be maintained for a long time without any change.

The coating layer 120 of the above artificial particle 100 is wrapped on the surface of the core 110. The coating layer 120 includes the continuously distributed rubber adhesive 122 and the dispersant 124 dispersed in the rubber adhesive 122. The rubber adhesive 122 is at least one selected from the group consisting of uncross-linked rubber and semi-cross-linked silicone rubber. The uncross-linked rubber and semi-cross-linked silicone rubber have plasticity and adhesion, thus the rubber adhesive 122 can be well wrapped on the surface of the core 110, and a plurality of artificial particles 100 can be shaped together. The distribution of the dispersant 124 can reduce or partially destroy the adhesion of the rubber adhesive 122. The distribution of the dispersant 124 allows the artificial particle 100 has plasticity and liquidity. Moreover, due to the stability, great oxidation resistance, and light resistance the uncross-linked rubber and semi-cross-linked silicone rubber, the rubber adhesive 122 can form a stable system combined with the dispersant 124, the functions of the artificial particle 100 can be maintained for at least nine months without any change. Accordingly, the artificial particle 100 has plasticity and liquidity for a long time, simultaneously.

The artificial particle 100 can be applied to children's toy, playground and so on, agricultural implantation, or hole filling material.

When the artificial particle 100 is applied to children's toy, a novel toy is obtained. A plurality of artificial particles 100 can form different shapes by pressing, and then can automatically become loose after a period of time. The artificial particles 100 will not harden and is fun for the children. Comparing with the raw sand, the artificial particle 100 is less harmful. The ratio and the composition of the rubber adhesive 122 and the dispersant 124 can be adjusted, thus the different modeling time and leveling time are obtained, and the artificial particles 100 with different plasticity and liquidity are obtained.

When the artificial particle 100 is applied to playground, polystyrene particle, river sand, or silica sand can be used as the core 110, thus the artificial particle 100 is bulkiness when it is in a normal stacking state, which provides great buffer performance for the playground and reduces the impact. Comparing with the raw sand, the artificial particle 100 is less harmfulness.

When the artificial particle 100 is applied to the agricultural implantation, preferably, straw or humus can be used as the core 110. A plurality of artificial particles 100 can be pressed to be a tight cake, which is conducive to packaging, storage and transportation. When the package is opened, the tight cake will become loose particles with permeability, which can provides nutrients and can be used to store nutrients for the solid plants.

When the artificial particle 100 is applied to the hole filling material, a plurality of artificial particles 100 are filled in a hole, and then automatically bulk to fill up the hole, and then the hole is easily to open after the hole is sealed.

Figure 2:
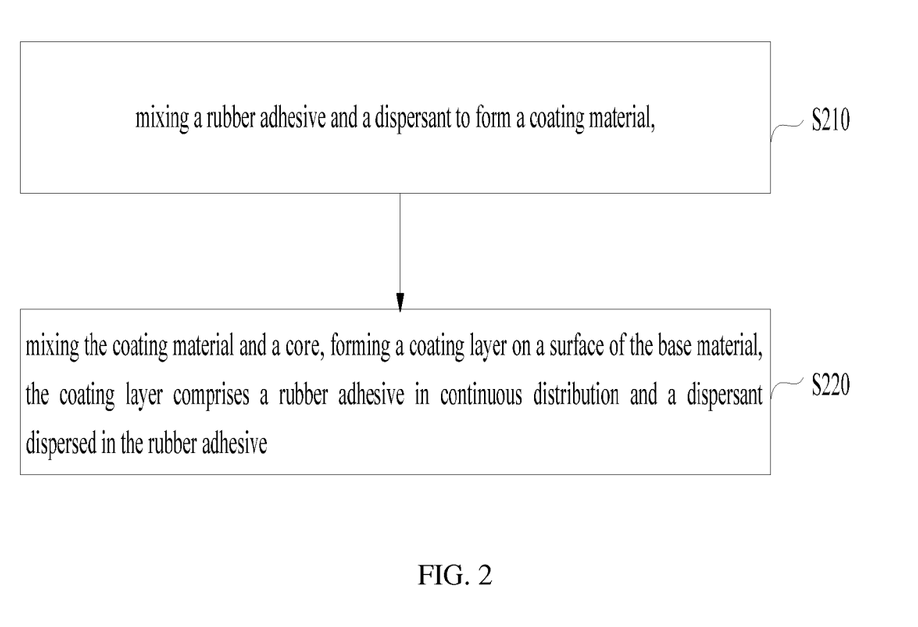
FIG. 2 is a flow chart of a method of preparing the artificial particle according to an embodiment.

Referring to FIG. 2, an first embodiment of a method of preparing an artificial particle includes:

Step S210, a rubber adhesive and a dispersant are mixed to form a coating material, where the rubber adhesive is at least one selected from the group consisting of uncross-linked rubber and semi-cross-linked silicone rubber.

The conventional rubber has to be vulcanized (i.e. crosslinked) to form an elastomer with high strength, certain shape and no plasticity. While both the uncross-linked rubber and semi-cross-linked silicone rubber have plasticity and adhesion, thus the uncross-linked rubber and semi-cross-linked silicone rubber can be reliably wrapped on the surface of the core and the artificial particle has plasticity.

The uncross-linked rubber is the rubber having no polymeric reaction with the cross-linking agent. Preferably, the uncross-linked rubber is at least one selected from the group consisting of polyisoprene rubber, polybutadiene rubber, polyisobutylene rubber, butyl rubber, ethylene propylene rubber, silicone rubber, nitrile rubber (butadiene and acrylonitrile copolymer), and styrene-butadiene rubber (butadiene and styrene copolymer). The uncross-linked rubber is relatively stable, and has great oxidation resistance and light resistance.

Preferably, the semi-cross-linked silicone rubber is a silicone rubber cross-linked with boron. The silicone rubber cross-linked with boron is obtained from a partially cross-linked (semi-cross-linked) reaction between the cross-linking agent and polydimethylsiloxane, where the boric acid or borate is used as the cross-linking agent. The silicone rubber cross-linked with boron is semisolid, which has self-leveling, self-adhesive, plasticity, and softening.

An embodiment of a method of preparing the semi-cross-linked silicone rubber includes:

a polydimethylsiloxane and a cross-linking agent are mixed according to a mass ratio of 200:1 to 20, and then the mixture is heated to a temperature of 100° C. to 345° C. to react for 0.5 to 10 hours to obtain the semi-cross-linked silicone rubber.

The cross-linking agent is boric acid or borate. The borate can be selected from the group consisting of metaborate, ortho-borate, and polyborate. Preferably, the borate is borax (sodium tetraborate).

The different uncross-linked rubbers have different tear strengths, the semi-cross-linked silicone rubber and the uncross-linked rubber have different tear strengths, thus when the different uncross-linked rubbers are mixed, or the semi-cross-linked silicone rubber and the uncross-linked rubber are mixed, the rubber adhesive can have appropriate tear strength; furthermore, the artificial particle has a certain adhesive strength to better implement the plasticity and fluidity.

Preferably, the rubber adhesive is a mixture of polyisoprene rubber and nitrile rubber, a volume ratio of the polyisoprene rubber to the nitrile rubber is 1 to 4:6 to 9. The rubber adhesive with different adhesion and stringiness can be obtained by mixing two uncross-linked rubbers according to different ratios. The rubber adhesive is firmly wrapped on the surface of the core, and the dispersant is firmly fixed inside of the rubber adhesive.

The dispersant is dispersed in the rubber adhesive, which can reduce or partially change the adhesion of the rubber adhesive. The adhesion of the rubber adhesive can be adjusted by the dispersant, thus the artificial particle has fluidity. Moreover, the different tear strengths of the covering layer can be obtained by adjusting the relationship between the rubber adhesive and the dispersant, therefore meeting the plasticity and fluidity needs of the artificial particle.

The dispersant is at least one selected from the group consisting of carbonate, silicate, vulcanized rubber powder, silica powder, glass microsphere, acrylonitrile polymer microcapsule expansion foam powder, fatty acid ester surfactant, alkyl benzene sulfonate emulsifier, paraffin oil, naphthenic oil, silicone oil, petroleum resin, terpene resin, magnesium oxide, aluminum oxide, and silicon oxide. The stability of those dispersant is great, the dispersant can form a stable system combined with the rubber adhesive; thus the functions of the artificial particle can be maintained for a long period.

Preferably, the carbonate is calcium carbonate or magnesium carbonate. Preferably, the silicate is calcium silicate or magnesium silicate.

For example, pulvistalci may be added, where the magnesium silicate is the main component of the pulvistalci.

Preferably, the vulcanized rubber powder is vulcanized butylbenzene rubber powder or vulcanized nitrile butadiene rubber powder.

Preferably, the fatty acid ester surfactant is glycerol monooleate or sorbitan monostearate.

Preferably, the alkyl benzene sulfonate emulsifier is sodium linear-dodecylbenzene sulfonate or dodecyl benzene sulfonate triethyl hydrate amite.

Preferably, the dispersant is a mixture of calcium carbonate and naphthenic oil, a volume ratio of the calcium carbonate to the naphthenic oil is 7:1.

Preferably, the dispersant is a mixture of magnesium silicate and silicone oil, a volume ratio of the magnesium silicate to the silicone oil is 9:1.

Preferably, the dispersant is a mixture of silicon oxide and sodium linear-dodecylbenzene sulfonate, a volume ratio of the silicon oxide to the sodium linear-dodecylbenzene sulfonate is 42:5.

By using those mixtures as the dispersant, the dispersant is more easily dispersed in the rubber adhesive, and the dispersant can form a more stable system combined with the rubber adhesive, thus the functions of the artificial particle can be maintained for a long period.

Step S220, the coating material and a core are mixed to form a coating layer on a surface of the core, the coating layer includes a continuously distributed rubber adhesive and a dispersant dispersed in the rubber adhesive.

The core is selected from the group consisting of polyacrylonitrile plastic particle, ethylene-vinyl acetate copolymer particle, polystyrene particle, quartz sand, river sand, sea sand, silica sand, glass bead, glass sand, humus, wood flour, grass meal, straw, and starch.

When the quartz sand, river sand, sea sand, silica sand, glass bead, glass sand, humus, wood flour, grass meal, straw, or starch is used as the core, thus the artificial particle can be applied in children's toy, playground and so on, which is valuable.

Preferably, a volume percentage of the core in the artificial particle is in a range of 70% to 99%; a volume percentage of the rubber adhesive in the artificial particle is in a range of 0.9% to 18%; a volume percentage of the dispersant in the artificial particle is in a range of 0.1% to 12%.

More preferably, a volume percentage of the core in the artificial particle is in a range of 85% to 97%, a volume percentage of the rubber adhesive in the artificial particle is in a range of 2% to 9%, a volume percentage of the dispersant in the artificial particle is in a range of 1% to 6%; the artificial particle with that ratio has much more appropriate adhesion and dispersibility; thus having better plasticity and liquidity. The artificial particle with plasticity and liquidity means that: when a plurality of artificial particles are pressed or squeezed, the artificial particles can form a certain shape and can maintain the certain shape for some time, i.e. the artificial particles have plasticity. When the shaped artificial particles are placed for a period of time, or destroyed by slightly force, the artificial particles will become loose, then the artificial particles will flow, i.e. the artificial particles have fluidity. The time for maintaining the certain shape for the artificial particles can be adjusted according to the needs, the time can be adjusted in a range of from one second to one month.

The above method for preparing artificial particle is simple and easy to operate.

Figure 3:
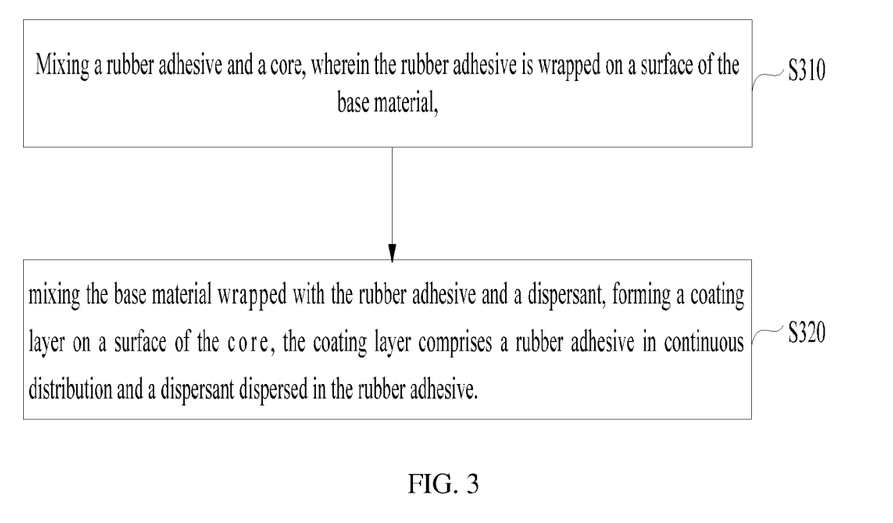
FIG. 3 is a flow chart of a method of preparing the artificial particle according to another embodiment.

Referring to FIG. 3, a second embodiment of a method of preparing an artificial particle includes:

Step S310, a rubber adhesive and a core are mixed, where the rubber adhesive is wrapped on a surface of the core, the rubber adhesive is at least one selected from the group consisting of uncross-linked rubber and semi-cross-linked silicone rubber.

The conventional rubber has to be vulcanized (i.e. cross-linked) to form an elastomer with high strength, certain shape and no plasticity. While both the uncross-linked rubber and semi-cross-linked silicone rubber have plasticity and adhesion, thus the uncross-linked rubber and semi-cross-linked silicone rubber can be reliably wrapped on the surface of the core and the artificial particle has plasticity.

The uncross-linked rubber is the rubber having no polymeric reaction with the cross-linking agent. Preferably, the uncross-linked rubber is at least one selected from the group consisting of polyisoprene rubber, polybutadiene rubber, polyisobutylene rubber, butyl rubber, ethylene propylene rubber, silicone rubber, nitrile rubber (butadiene and acrylonitrile copolymer), and styrene-butadiene rubber (butadiene and styrene copolymer).

The semi-cross-linked silicone rubber is a silicone rubber cross-linked with boron. The silicone rubber cross-linked with boron is obtained from a partially cross-linked (semi-cross-linked) reaction between the cross-linking agent and polydimethylsiloxane, where the boric acid or borate is used as the cross-linking agent. The silicone rubber cross-linked with boron is semisolid, which has self-leveling, self-adhesive, plasticity, and softening.

An embodiment of a method of preparing the semi-cross-linked silicone rubber includes:

a polydimethylsiloxane and a cross-linking agent are mixed according to a mass ratio of 200:1 to 20, and then the mixture is heated to a temperature of 100° C. to 345° C. to react for 0.5 to 10 hours to obtain the semi-cross-linked silicone rubber.

The cross-linking agent is boric acid or borate. The borate can be selected from the group consisting of metaborate, ortho-borate, and polyborate. Preferably, the borate is borax (sodium tetraborate).

The different uncross-linked rubbers have different tear strengths, the semi-cross-linked silicone rubber and the uncross-linked rubber have different tear strengths, thus when the different uncross-linked rubbers are mixed, or the semi-cross-linked silicone rubber and the uncross-linked rubber are mixed, the rubber adhesive can have appropriate tear strength; furthermore, the artificial particle has a certain adhesive strength to better implement the plasticity and fluidity.

Preferably, the rubber adhesive is a mixture of polyisoprene rubber and nitrile rubber, a volume ratio of the polyisoprene rubber to the nitrile rubber is 1 to 4:6 to 9. The rubber adhesive with different adhesion and stringiness can be obtained by mixing two uncross-linked rubbers according to different ratios. The rubber adhesive is firmly wrapped on the surface of the core, and the dispersant is firmly fixed inside of the rubber adhesive. The core is selected from the group consisting of polyacrylonitrile plastic particle, ethylene-vinyl acetate copolymer particle, polystyrene particle, quartz sand, river sand, sea sand, silica sand, glass bead, glass sand, humus, wood flour, grass meal, straw, and starch.

When the quartz sand, river sand, sea sand, silica sand, glass bead, glass sand, humus, wood flour, grass meal, straw, or starch is used as the core, thus the artificial particle can be applied to children's toy, playground and so on, which is valuable.

Specifically, when the rubber adhesive is liquid, the rubber adhesive and the core are mixed at room temperature. When the rubber adhesive is solid, then the rubber adhesive is heated to melt, and then mixed with the core.

Preferably, the rubber adhesive and the core are mixed by a kneader or a disperser.

Step S320, the core wrapped with the rubber adhesive and a dispersant are mixed to form a coating layer on a surface of the core, the coating layer includes a continuously distributed rubber adhesive and a dispersant dispersed in the rubber adhesive.

Specifically, the core wrapped with the rubber adhesive and the dispersant are mixed by stirring.

The dispersant is dispersed in the rubber adhesive, which can reduce or partially change the adhesion of the rubber adhesive. The adhesion of the rubber adhesive can be adjusted by the dispersant, thus the artificial particle has fluidity. Moreover, the different tear strengths of the covering layer can be obtained by adjusting the relationship between the rubber adhesive and the dispersant, therefore meeting the plasticity and fluidity needs of the artificial particle.

The dispersant is at least one selected from the group consisting of carbonate, silicate, vulcanized rubber powder, silica powder, glass microsphere, acrylonitrile polymer microcapsule expansion foam powder, fatty acid ester surfactant, alkyl benzene sulfonate emulsifier, paraffin oil, naphthenic oil, silicone oil, petroleum resin, terpene resin, magnesium oxide, aluminum oxide, and silicon oxide. The stability of those dispersant is great, the dispersant can form a stable system combined with the rubber adhesive; thus the functions of the artificial particle can be maintained for a long period.

Preferably, the carbonate is calcium carbonate or magnesium carbonate. Preferably, the silicate is calcium silicate or magnesium silicate.

For example, pulvistalci may be added, where the magnesium silicate is the main component of the pulvistalci.

Preferably, the vulcanized rubber powder is vulcanized butylbenzene rubber powder or vulcanized nitrile butadiene rubber powder.

Preferably, the fatty acid ester surfactant is glycerol monooleate or sorbitan monostearate.

Preferably, the alkyl benzene sulfonate emulsifier is sodium linear-dodecylbenzene sulfonate or dodecyl benzene sulfonate triethyl hydrate amite.

Preferably, the dispersant is a mixture of calcium carbonate and naphthenic oil, a volume ratio of the calcium carbonate to the naphthenic oil is 7:1.

Preferably, the dispersant is a mixture of magnesium silicate and silicone oil, a volume ratio of the magnesium silicate to the silicone oil is 9:1.

Preferably, the dispersant is a mixture of silicon oxide and sodium linear-dodecylbenzene sulfonate, a volume ratio of the silicon oxide to the sodium linear-dodecylbenzene sulfonate is 42:5.

By using those mixtures as the dispersant, the dispersant is more easily dispersed in the rubber adhesive, and the dispersant can form a more stable system combined with the rubber adhesive, thus the functions of the artificial particle can be maintained for a long period.

Preferably, a volume percentage of the core in the artificial particle is in a range of 70% to 99%; a volume percentage of the rubber adhesive in the artificial particle is in a range of 0.9% to 18%; a volume percentage of the dispersant in the artificial particle is in a range of 0.1% to 12%.

More preferably, a volume percentage of the core in the artificial particle is in a range of 85% to 97%, a volume percentage of the rubber adhesive in the artificial particle is in a range of 2% to 9%, a volume percentage of the dispersant in the artificial particle is in a range of 1% to 6%; the artificial particle with that ratio has much more appropriate adhesion and dispersibility, thus having better plasticity and liquidity. The artificial particle with plasticity and liquidity means that: when a plurality of artificial particles are pressed or squeezed, the artificial particles can form a certain shape and can maintain the certain shape for some time, i.e. the artificial particles have plasticity. When the shaped artificial particles are placed for a period of time, or destroyed by slightly force, the artificial particles will become loose, then the artificial particles will flow, i.e. the artificial particles have fluidity. The time for maintaining the certain shape for the artificial particles can be adjusted according to the needs, the time can be adjusted in a range of from one second to one month.

The above method for preparing artificial particle is simple and easy to operate.

Figure 4:
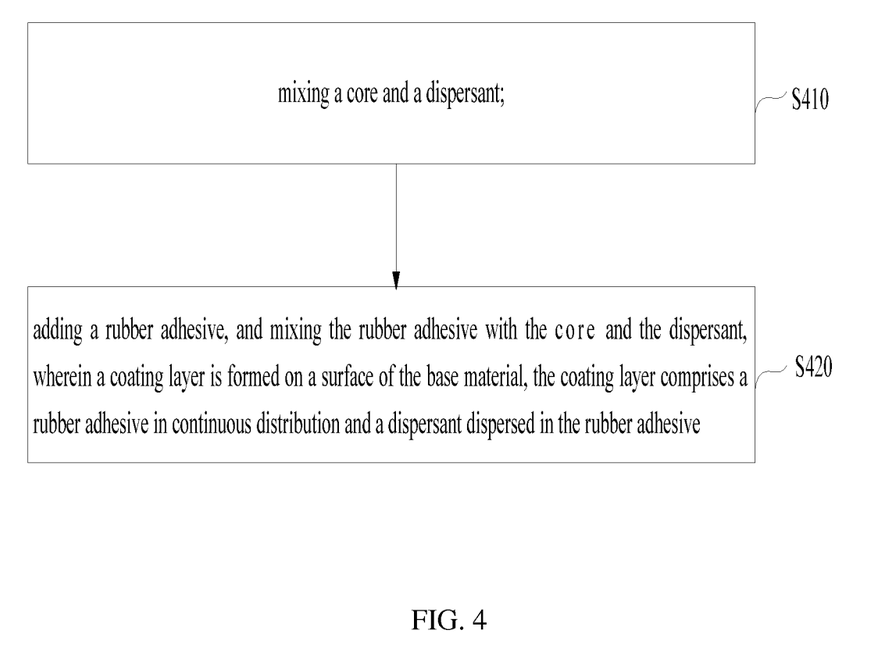
FIG. 4 is a flow chart of a method of preparing the artificial particle according to yet another embodiment.

Referring to FIG. 4, a third embodiment of a method of preparing an artificial particle includes:

Step S410, a core and a dispersant are mixed.

The core is selected from the group consisting of polyacrylonitrile plastic particle, ethylene-vinyl acetate copolymer particle, polystyrene particle, quartz sand, river sand, sea sand, silica sand, glass bead, glass sand, humus, wood flour, grass meal, straw, and starch.

When the quartz sand, river sand, sea sand, silica sand, glass bead, glass sand, humus, wood flour, grass meal, straw, or starch is used as the core, thus the artificial particle can be applied to children's toy, playground and so on, which is valuable.

The dispersant is dispersed in the rubber adhesive, which can reduce or partially change the adhesion of the rubber adhesive. The adhesion of the rubber adhesive can be adjusted by the dispersant, thus the artificial particle has fluidity. Moreover, the different tear strengths of the covering layer can be obtained by adjusting the relationship between the rubber adhesive and the dispersant, therefore meeting the plasticity and fluidity needs of the artificial particle.

The dispersant is at least one selected from the group consisting of carbonate, silicate, vulcanized rubber powder, silica powder, glass microsphere, acrylonitrile polymer microcapsule expansion foam powder, fatty acid ester surfactant, alkyl benzene sulfonate emulsifier, paraffin oil, naphthenic oil, silicone oil, petroleum resin, terpene resin, magnesium oxide, aluminum oxide, and silicon oxide. The stability of those dispersant is great, the dispersant can form a stable system combined with the rubber adhesive; thus the functions of the artificial particle can be maintained for a long period.

Preferably, the carbonate is calcium carbonate or magnesium carbonate. Preferably, the silicate is calcium silicate or magnesium silicate.

For example, pulvistalci may be added, where the magnesium silicate is the main component of the pulvistalci.

Preferably, the vulcanized rubber powder is vulcanized butylbenzene rubber powder or vulcanized nitrile butadiene rubber powder.

Preferably, the fatty acid ester surfactant is glycerol monooleate or sorbitan monostearate.

Preferably, the alkyl benzene sulfonate emulsifier is sodium linear-dodecylbenzene sulfonate or dodecyl benzene sulfonate triethyl hydrate amite.

Preferably, the dispersant is a mixture of calcium carbonate and naphthenic oil; a volume ratio of the calcium carbonate to the naphthenic oil is 7:1.

Preferably, the dispersant is a mixture of magnesium silicate and silicone oil, a volume ratio of the magnesium silicate to the silicone oil is 9:1.

Preferably, the dispersant is a mixture of silicon oxide and sodium linear-dodecylbenzene sulfonate, a volume ratio of the silicon oxide to the sodium linear-dodecylbenzene sulfonate is 42:5.

By using those mixtures as the dispersant, the dispersant is more easily dispersed in the rubber adhesive, and the dispersant can form a more stable system combined with the rubber adhesive, thus the functions of the artificial particle can be maintained for a long period.

Step S420, a rubber adhesive is added and then mixed with the dispersant and the core. A coating layer is formed on a surface of the core. The coating layer includes a continuously distributed rubber adhesive and a dispersant dispersed in the rubber adhesive; the rubber adhesive is at least one selected from the group consisting of uncross-linked rubber and semi-cross-linked silicone rubber.

The conventional rubber has to be vulcanized (i.e. cross-linked) to form an elastomer with high strength, certain shape and no plasticity. While both the uncross-linked rubber and semi-cross-linked silicone rubber have plasticity and adhesion, thus the uncross-linked rubber and semi-cross-linked silicone rubber can be reliably wrapped on the surface of the core and the artificial particle has plasticity.

The uncross-linked rubber is the rubber having no polymeric reaction with the cross-linking agent. Preferably, the uncross-linked rubber is at least one selected from the group consisting of polyisoprene rubber, polybutadiene rubber, polyisobutylene rubber, butyl rubber, ethylene propylene rubber, silicone rubber, nitrile rubber (butadiene and acrylonitrile copolymer), and styrene-butadiene rubber (butadiene and styrene copolymer).

The semi-cross-linked silicone rubber is a silicone rubber cross-linked with boron. The silicone rubber cross-linked with boronis is obtained from a partially cross-linked (semi-cross-linked) reaction between the cross-linking agent and polydimethylsiloxane, where the boric acid or borate is used as the cross-linking agent. The silicone rubber cross-linked with boron is semisolid, which has self-leveling, self-adhesive, plasticity, and softening.

An embodiment of a method of preparing the semi-cross-linked silicone rubber includes:

a polydimethylsiloxane and a cross-linking agent are mixed according to a mass ratio of 200:1 to 20, and then the mixture is heated to a temperature of 100° C. to 345° C. to react for 0.5 to 10 hours to obtain the semi-cross-linked silicone rubber.

The cross-linking agent is boric acid or borate. The borate can be selected from the group consisting of metaborate, ortho-borate, and polyborate. Preferably, the borate is borax (sodium tetraborate)

The different uncross-linked rubbers have different tear strengths, the semi-cross-linked silicone rubber and the uncross-linked rubber have different tear strengths, thus when the different uncross-linked rubbers are mixed, or the semi-cross-linked silicone rubber and the uncross-linked rubber are mixed, the rubber adhesive can have appropriate tear strength, furthermore, the artificial particle 100 has a certain adhesive strength to better implement the plasticity and fluidity.

Preferably, the rubber adhesive is a mixture of polyisoprene rubber and nitrile rubber, a volume ratio of the polyisoprene rubber to the nitrile rubber is 1 to 4:6 to 9. The rubber adhesive with different adhesion and stringiness can be obtained by mixing two uncross-linked rubbers according to different ratios. The rubber adhesive is firmly wrapped on the surface of the core, and the dispersant is firmly fixed inside of the rubber adhesive.

Preferably, a volume percentage of the core in the artificial particle is in a range of 70% to 99%; a volume percentage of the rubber adhesive in the artificial particle is in a range of 0.9% to 18%; a volume percentage of the dispersant in the artificial particle is in a range of 0.1% to 12%.

More preferably, a volume percentage of the core in the artificial particle is in a range of 85% to 97%, a volume percentage of the rubber adhesive in the artificial particle is in a range of 2% to 9%, a volume percentage of the dispersant in the artificial particle is in a range of 1% to 6%; the artificial particle with that ratio has much more appropriate adhesion and dispersibility; thus having better plasticity and liquidity. The artificial particle with plasticity and liquidity means that: when a plurality of artificial particles are pressed or squeezed, the artificial particles can form a certain shape and can maintain the certain shape for some time, i.e. the artificial particles have plasticity. When the shaped artificial particles are placed for a period of time, or destroyed by slightly force, the artificial particles will become loose, then the artificial particles will flow, i.e. the artificial particles have fluidity. The time for maintaining the certain shape for the artificial particles can be adjusted according to the needs, the time can be adjusted in a range of from one second to one month.

The above method for preparing artificial particle is simple and easy to operate.

The specific embodiments are shown as follows:

EXAMPLE 1

A method of preparing artificial particle includes:
1. Materials were provided according to Table 1. A core and a rubber adhesive were mixed, thus the rubber adhesive was wrapped on a surface of the core.

2. The core wrapped with the rubber adhesive was mixed with a dispersant, a coating layer was formed on the surface of the core, and an artificial particle was obtained. This artificial particle can be applied to the children's toy.

The plasticity and liquidity of the artificial particle were tested by: a hollow cylindrical cup with a diameter of 2 centimeters and a height of 2 centimeters was provided on a table. In the environment of 25±2° C., the hollow cylindrical cup was filled with artificial particles and pressed by weight of 500 grams. The weight was removed after 60 seconds. Then the hollow cylindrical cup was gently removed. The artificial particles were remained the shape without external force. The start loose time and the loose leveling time were tested, thus the plasticity and the liquidity of the artificial particle were reflected, respectively. The start loose time and the loose leveling time of the illustrated embodiment were shown in Table 2.

The quality guarantee period of the artificial particle was reflected by the time of the plasticity and the liquidity of the artificial particle. In order to quickly assess the quality guarantee period of the artificial particle in the natural state, the artificial particle prepared in the illustrated embodiment was circularly tested at a high temperature of 57° C. to 60° C. and a low temperature of −18° C. to −20° C., a high temperature of 24 hours and a low temperature of 24 hours cycle was a cycle. If the functions of the artificial particle were maintained for one cycle without any change in these tests, which represented that the functions of the artificial particle can be maintained for four months in normal natural state; if the functions of the artificial particle were maintained for two cycles without any change in these tests, which represented that the functions of the artificial particle can be maintained for nine months in normal natural state; if the functions of the artificial particle were maintained for three cycles without any change in these tests, which represented that the functions of the artificial particle can be maintained for fifteen months in normal natural state; if the functions of the artificial particle were maintained for four cycles without any change in these tests, which represented that the functions of the artificial particle can be maintained for twenty four months in normal natural state. Four test cycles were enough. The test results of the artificial particles of the illustrated embodiment were shown in Table 2.

EXAMPLE 2

A method of preparing artificial particle includes:
1. Materials were provided according to table 1. A rubber adhesive and a dispersant were mixed to form coating material.
2. The coating material and the core were mixed to form a coating layer on the surface of the core, and an artificial particle was obtained. This artificial particle can be applied in the agricultural implantation.

The test results of the start loose time, the loose leveling time, and the quality guarantee period of the artificial particles of the illustrated embodiment were shown in Table 2.

EXAMPLE 3

A method of preparing artificial particle includes:
1. Materials were provided according to the volume percentages shown in table 1. A core and a dispersant were mixed.
2. A rubber adhesive was added and mixed with the core and the dispersant to form a coating layer wrapped on the surface of the core, and an artificial particle was obtained. This artificial particle can be applied in the hole filling material.

The test results of the start loose time, the loose leveling time, and the quality guarantee period of the artificial particles of the illustrated embodiment were shown in Table 2.

EXAMPLE 4

A method of preparing artificial particle includes:
1. Materials were provided according to table 1. A core and a dispersant were mixed.
2. Polydimethylsiloxane and boric acid were mixed according to a mass ratio of 200:1, and the mixture was heated to 100° C. to perform a cross-linking reaction for 10 hours to obtain a semi-cross-linked silicone rubber.
3. A rubber adhesive was added according to table 1 and mixed with the core and the dispersant. A coating layer is formed on the surface of the core, and an artificial particle was obtained. The artificial particle can be applied in the playground.

The test results of the start loose time, the loose leveling time, and the quality guarantee period of the artificial particles of the illustrated embodiment were shown in Table 2.

The method of preparing artificial particle of examples 5 to 8 were similar to that of the example 1, which is not described in detail here. The test results of the start loose time, the loose leveling time, and the quality guarantee period of the artificial particles of the examples 5 to 8 were shown in Table 2.

EXAMPLE 9

A method of preparing artificial particle includes:
1. Polydimethylsiloxane and boric acid were mixed according to a mass ratio of 200:20, and the mixture was heated to 250° C. to perform a cross-linking reaction for 3 hours to obtain a semi-cross-linked silicone rubber.
2. Materials were provided according to the table 1. A core and a rubber adhesive were mixed, thus the rubber adhesive was wrapped on the surface of the core.
3. The core wrapped with the rubber adhesive was mixed with a dispersant, a coating layer was formed on the surface of the core, and an artificial particle was obtained.

The test results of the start loose time, the loose leveling time, and the quality guarantee period of the artificial particles of the illustrated embodiment were shown in Table 2.

The method of preparing artificial particle of examples 10 to 11 were similar to that of the example 2, the method of preparing artificial particle of examples 12 to 13 were similar to that of the example 3, which are not described in detail here. The test results of the start loose time, the loose leveling time, and the quality guarantee period of the artificial particles of the examples 10 to 13 were shown in Table 2.

EXAMPLE 14

A method of preparing artificial particle includes:
1. Polydimethylsiloxane and borax were mixed according to a mass ratio of 200:10, and the mixture was heated to 345° C. to perform a cross-linking reaction for 0.5 hours to obtain a semi-cross-linked silicone rubber.
2. Materials were provided according to the table 1. A rubber adhesive and a dispersant were mixed to form coating material.
3. The coating material is mixed with a core to form a coating layer on the surface of the core, and an artificial particle was obtained.

The test results of the start loose time, the loose leveling time, and the quality guarantee period of the artificial particles of the illustrated embodiment were shown in Table 2.

Table 1 shows volume percentages of the core, the rubber adhesive, and the dispersant of the artificial particle according to examples 1 to 14.

TABLE 1

| Example | the core and the volume percentage thereof (%) | the rubber adhesive and the volume percentage thereof (%) | the dispersant and the volume percentage thereof (%) |
|---|---|---|---|
| Example 1 | polyacrylonitrile plastic particle; 70% | polyisoprene rubber, 1.8%, nitrile rubber, 16.2% | calcium carbonate, 10.5%, naphthenic oil, 1.5% |
| Example 2 | straw; 99% | polybutadiene rubber, 0.3%, polyisobutylene rubber, 0.6% | silicone oil, 0.1% |
| Example 3 | glass sand; 89% | ethylene propylene rubber, 2.1%, polyisobutylene rubber, 4.2% | sodium linear-dodecylbenzene sulfonate, 0.5%, silicon oxide, 4.2% |
| Example 4 | river sand; 89% | semi-cross-linked silicone rubber, 6% | magnesium silicate, 4.5%, silicone oil, 0.5% |
| Example 5 | quartz sand; 97% | polyisobutylene rubber, 2% | acrylonitrile polymer microcapsule expansion foam powder, 0.3%, silicon oxide, 0.6%, silicone oil, 0.1% |
| Example 6 | sea sand; 79% | styrene-butadiene rubber, 4.5%, ethylene propylene rubber, 4.5% | petroleum resin, 4.6%, magnesium oxide, 2%, silicon oxide, 5.4% |
| Example 7 | silica sand; 85% | polyisoprene rubber, 3.7%, polybutadiene rubber, 4.3% | terpene resin, 4%, calcium carbonate, 2.6%, glycerol monooleate, 0.4% |

TABLE 1-continued

| Example | the core and the volume percentage thereof (%) | the rubber adhesive and the volume percentage thereof (%) | the dispersant and the volume percentage thereof (%) |
|---|---|---|---|
| Example 8 | glass bead; 87% | polyisoprene rubber, 1.7%, polyisobutylene rubber, 4.3% | magnesium carbonate, 4%, calcium carbonate, 2.7%, dodecyl benzene sulfonate triethyl hydrate amit, 0.3% |
| Example 9 | humus; 91% | silicone rubber, 2%, semi-cross-linked silicone rubber, 1% | silicon oxide, 3%, glass microsphere, 2.6%, glycerol monooleate or sorbitan monostearate, 0.4% |
| Example 10 | wood flour; 98% | styrene-butadiene rubber, 0.3%, polyisoprene rubber, 0.2%, nitrile rubber, 0.5% | silicone oil, 0.6%, aluminum oxide, 0.4% |
| Example 11 | grass meal; 93% | styrene-butadiene rubber, 0.5%, nitrile rubber, 1.2%, polyisoprene rubber, 0.4%, butyl rubber, 0.3% | silica powder, 1%, sodium linear-dodecylbenzene sulfonate, 3.6% |
| Example 12 | starch; 93% | butyl rubber, 0.8%, polyisoprene rubber, 1.6% | paraffin oil, 0.7%, vulcanized nitrile butadiene rubber powder, 2%, silica powder, 1.9% |
| Example 13 | ethylene-vinyl acetate copolymer particle; 73% | polyisoprene rubber, 6.2%, nitrile rubber, 9.3% | vulcanized nitrile butadiene rubber powder, 10.1%, glycerol monooleate, 1.4% |
| Example 14 | polystyrene particle; 79.2% | polyisobutylene rubber, 8.4%, silicone rubber, 4.2%, semi-cross-linked silicone rubber, 3.1% | paraffin oil, 5.1% |

Table 2 shows the test results of the start loose time, the loose leveling time, and the quality guarantee period of the artificial particles of Example 1 to Example 14.

TABLE 2

| Example | start loose time (second) | loose leveling time (second) | quality guarantee period (number) |
|---|---|---|---|
| Example 1 | 727 | 1144 | 4 |
| Example 2 | 244 | 412 | 3 |
| Example 3 | 267 | 485 | 4 |
| Example 4 | 51 | 87 | 4 |
| Example 5 | 42 | 72 | 4 |
| Example 6 | 64 | 98 | 4 |
| Example 7 | 46 | 73 | 4 |
| Example 8 | 49 | 74 | 4 |
| Example 9 | 62 | 146 | 2 |
| Example 10 | 23 | 52 | 3 |
| Example 11 | 36 | 69 | 3 |
| Example 12 | 69 | 144 | 4 |
| Example 13 | 176 | 469 | 4 |
| Example 14 | 74 | 164 | 4 |

As can be seen from Table 2, the start loose time and the loose leveling time of the artificial particles according to Example 1 to Example 14 were different from each other, which shown that the start loose time and the loose leveling time were different due to the different cores, rubber adhesives, and dispersants. The start loose time was at least 42 seconds, i.e., the artificial particle can form a certain shape for at least 42 seconds. According to different purposes, the core, the rubber adhesive, and the dispersant can be mixed according to different ratios to obtain the artificial particles with the desired plasticity and liquidity.

As can be also seen from Table 2, after the artificial particle of Example 1 to Example 14 were tested at the high temperature of 57° C. to 60° C. and the low temperature of −18° C. to −20° C., it can be seen that the quality guarantee periods of the artificial particles according to Example 1 to Example 14 were at least 2 cycles, i.e. the functions of the artificial particle can be maintained for nine months in normal natural state; which shown that the artificial particle has plasticity and liquidity for a long time.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. An artificial particle, comprising:
   a core; and
   a coating layer wrapped on a surface of the core;
   wherein the coating layer comprises a continuously distributed rubber adhesive and a dispersant dispersed in the rubber adhesive; the rubber adhesive comprises uncross-linked rubber and partially cross-linked silicone rubber;
   wherein the uncross-linked rubber is at least one selected from the group consisting of polyisoprene rubber, polybutadiene rubber, polyisobutylene rubber, butyl rubber, ethylene propylene rubber, silicone rubber, nitrite rubber, and styrene-butadiene rubber;
wherein the partially cross-linked silicone rubber is silicone rubber cross-linked with boron.

2. The artificial particle according to claim 1, wherein a volume percentage of the core in the artificial particle is in a range of 70% to 99%, a volume percentage of the rubber adhesive in the artificial particle is in a range of 0.9% to 18%, a volume percentage of the dispersant in the artificial particle is in a range of 0.1% to 12%.

3. The artificial particle according to claim 2, wherein a volume percentage of the core in the artificial particle is in a range of 85% to 97%, a volume percentage of the rubber adhesive in the artificial particle is in a range of 2% to 9%, a volume percentage of the dispersant in the artificial particle is in a range of 1% to 6%.

4. The artificial particle according to claim 1, wherein the core is selected from the group consisting of polyacrylonitrile plastic particle, ethylene-vinyl acetate copolymer particle, polystyrene particle, quartz sand, river sand, sea sand, silica sand, glass bead, glass sand, humus, wood flour, grass meal, straw, and starch.

5. The artificial particle according to claim 1, wherein the dispersant is at least one selected from the group consisting of carbonate, silicate, vulcanized rubber powder, glass microsphere, acrylonitrile polymer microcapsule expansion foam powder, fatty acid ester surfactant, alkyl benzene sulfonate emulsifier, paraffin oil, naphthenic oil, silicone oil, petroleum resin, terpene resin, magnesium oxide, aluminum oxide, and silicon oxide.

6. The artificial particle according to claim 5, wherein tie carbonate is calcium carbonate or magnesium carbonate.

7. The artificial particle according to claim 5, wherein the silicate is calcium silicate or magnesium silicate.

8. The artificial particle according to claim 5, wherein the vulcanized rubber powder is vulcanized butylbenzene rubber powder or vulcanized nitrile butadiene rubber powder.

9. The artificial particle according to claim 5, wherein the fatty acid ester surfactant is glycerol monooleate or sorbitan monostearate.

10. The artificial particle according to claim 5, wherein the alkyl benzene sulfonate emulsifier is sodium linear-dodecylbenzene sulfonate or dodecyl benzene sulfonate triethyl hydrate amite.

11. The artificial particle according to claim 1, wherein the dispersant is a mixture of calcium carbonate and naphthenic oil, and a volume ratio of the calcium carbonate to the naphthenic oil is 7:1.

12. The artificial particle according to claim 1, wherein the dispersant is a mixture of magnesium silicate and silicone oil, and a volume ratio of the magnesium silicate to the silicone oil is 9:1.

13. The artificial particle according to claim 1, wherein the dispersant is a mixture of silicon oxide and sodium linear-dodecylbenzene sulfonate, and a volume ratio of the silicon oxide to the sodium linear-dodecylbenzene sulfonate is 42:5.

14. The artificial particle according to claim 1, wherein the rubber adhesive is a mixture of polyisoprene rubber and nitrile rubber, and a volume ratio of the polyisoprene rubber to the nitrile rubber is 1:4 to 6:9.

15. A method of preparing an artificial particle according claim 1, comprising:
mixing a rubber adhesive and a dispersant to form a coating material, wherein the rubber adhesive is at least one selected from the group consisting of uncross-linked rubber and partially cross-linked silicone rubber; and
mixing the coating material and a core, forming a coating layer on a surface of the core, wherein the coating layer comprises a continuously distributed rubber adhesive and a dispersant dispersed in the rubber adhesive.

16. The method of preparing artificial particle according to claim 15, wherein a method of preparing the semi-cross-linked silicone rubber comprises:
mixing a polydimethylsiloxane and a cross-linking agent according to a mass ratio of 200: 1 to 20 to obtain a mixture, then heating the mixture to a temperature of 100° C. to 345° C. to react for 0.5 to 10 hours to obtain the semi-cross-linked silicone rubber.

17. A method of preparing an artificial particle according to claim 1, comprising:
mixing a rubber adhesive and a core, wherein the rubber adhesive is wrapped on a surface of the core, the rubber adhesive is at least one selected from the group consisting of uncross-linked rubber and partially cross-linked silicone rubber; and
mixing the core wrapped with the rubber adhesive and a dispersant, forming a coating layer on a surface of the core, wherein the coating layer comprises a continuously distributed rubber adhesive and a dispersant dispersed in the rubber adhesive.

\* \* \* \* \*